(12) United States Patent
Habib et al.

(10) Patent No.: US 12,370,522 B2
(45) Date of Patent: Jul. 29, 2025

(54) OXYGEN TRANSPORT REACTORS FOR CO-GENERATING AMMONIA AND POWER

(71) Applicants: King Fahd University of Petroleum and Minerals, Dhahran (SA); King Abdullah City for Atomic & Renewable Energy (K.A.CARE), Riyadh (SA)

(72) Inventors: Mohammed Abdulaziz Habib, Dhahran (SA); Binash Imteyaz, Dhahran (SA)

(73) Assignees: King Fahd University of Petroleum and Minerals, Dhahran (SA); King Abdullah City for Atomic & Renewable Energy (K.A. CARE), Riyadh (SA)

( * ) Notice: Subject to any disclaimer, the term of this patent is extended or adjusted under 35 U.S.C. 154(b) by 709 days.

(21) Appl. No.: 17/841,265

(22) Filed: Jun. 15, 2022

(65) Prior Publication Data

US 2023/0405545 A1   Dec. 21, 2023

(51) Int. Cl.
*B01J 19/24* (2006.01)
*B01D 53/22* (2006.01)
(Continued)

(52) U.S. Cl.
CPC ........ *B01J 19/2475* (2013.01); *B01D 53/227* (2013.01); *B01D 53/228* (2013.01);
(Continued)

(58) Field of Classification Search
CPC ...... B01D 53/00; B01D 53/22; B01D 53/225; B01D 53/227; B01D 53/228;
(Continued)

(56) References Cited

U.S. PATENT DOCUMENTS

| | | | |
|---|---|---|---|
| 9,664,115 B2 * | 5/2017 | Nemitallah | ......... C01B 13/0251 |
| 10,597,292 B2 | 3/2020 | Mokheimer et al. | |
| 10,619,571 B2 | 4/2020 | Nemitallah et al. | |

FOREIGN PATENT DOCUMENTS

| | | |
|---|---|---|
| EP | 0 964 466 B2 | 9/2008 |
| EP | 3 089 943 B1 | 11/2018 |
| EP | 3 907 386 A1 | 11/2021 |

* cited by examiner

*Primary Examiner* — Natasha E Young
(74) *Attorney, Agent, or Firm* — Oblon, McClelland, Maier & Neustadt, L.L.P.

(57) ABSTRACT

A system for co-generating ammonia and power is described. The system includes oxygen transport reactors having an ion transport membrane (ITM) that separates a feed side and a permeate side. The feed side includes a feed inlet and a feed outlet, and the permeate side includes a permeate inlet and a permeate outlet. A first feed inlet receives water vapor to be converted into hydrogen and first oxygen, and a second feed inlet receives air to be split into nitrogen and second oxygen. The ITM selectively allows permeation of the first oxygen and the second oxygen to respective permeate side to support oxy-combustion process. A first feed outlet discharges hydrogen and a second feed outlet discharges nitrogen, where the hydrogen and the nitrogen are combined in a catalytic converter to form ammonia. Combustion gases from the oxygen transport reactors are used to run a gas turbine to extract power.

20 Claims, 12 Drawing Sheets

(51) Int. Cl.
*B01J 19/00* (2006.01)
*C01B 3/02* (2006.01)
*C01B 3/04* (2006.01)
*C01B 13/02* (2006.01)
*C01B 32/50* (2017.01)
*C01C 1/04* (2006.01)
*F02C 6/04* (2006.01)
*F02C 7/12* (2006.01)

(52) U.S. Cl.
CPC ........ *B01D 53/229* (2013.01); *B01J 19/0013* (2013.01); *B01J 19/245* (2013.01); *C01B 3/025* (2013.01); *C01B 3/045* (2013.01); *C01B 13/0207* (2013.01); *C01B 13/0251* (2013.01); *C01B 32/50* (2017.08); *C01C 1/04* (2013.01); *F02C 6/04* (2013.01); *F02C 7/12* (2013.01); *B01J 2219/00117* (2013.01)

(58) Field of Classification Search
CPC ..... B01D 53/229; B01J 19/00; B01J 19/0006; B01J 19/0013; B01J 19/24; B01J 19/245; B01J 19/2475; B01J 2219/00; B01J 2219/00049; B01J 2219/00051; B01J 2219/00074; B01J 2219/00117; C01B 3/00; C01B 3/02; C01B 3/025; C01B 3/04; C01B 3/042; C01B 3/045; C01B 13/00; C01B 13/02; C01B 13/0203; C01B 13/0207; C01B 13/0229; C01B 13/0248; C01B 13/0251; C01C 1/00; C01C 1/02; C01C 1/04; F02C 6/00; F02C 6/04; F02C 7/00; F02C 7/12
See application file for complete search history.

OXYGEN TRANSPORT REACTORS FOR CO-GENERATING AMMONIA AND POWER

BACKGROUND

Technical Field

The present disclosure is directed generally to a power generation system and particularly to an oxygen-transport-reactor-based power generation system for carbon capture and co-production of hydrogen.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Renewable energy has emerged as a favorable alternative to sustain clean energy supply, however, energy storage and transportation over long distances has associated challenges. Hydrogen production through renewable energy is envisaged to be a promising solution to solve such challenges [See: T. N. Veziroglu, "Hydrogen Energy System: A Permanent Solution To Global Problems," www_.iahe.org, 1999]. However, hydrogen storage and transportation is hazardous and cost-inefficient. Hence, hydrogen-rich compounds, which can be liquefied under mild conditions (for example, ammonia, methane, and methanol), have recently gained attention as hydrogen carriers. Ammonia, being the only carbon-free carrier, has an energy density of 13.6 $GJ/m^3$ lying between compressed natural gas (CNG) and liquified petroleum gas (LPG) [See: C. Zamfirescu and I. Dincer, "Ammonia as a green fuel and hydrogen source for vehicular applications," Fuel Process. Technol., vol. 90, no. 5, pp. 729-737, 2009]. Characterized with the features like liquefaction at room temperature, high volumetric and gravimetric density, low risk hazards during storing, transporting, and utilizing, green ammonia is considered as an attractive future energy carrier.

Various techniques of solar hydrogen production have evolved to industrial and commercial maturity, including (a) photochemical, (b) thermochemical, and (c) electrochemical technologies. However, hydrogen production, through either hydrocarbon reforming or water splitting, is a highly energy-intensive process. Integrating hydrogen production technology with combustion systems, such as gas turbine power generation, can provide energy-efficient, high-yield co-generation system. Moreover, hydrogen production can be significantly enhanced by selectively removing products from the reacting mixture, allowing reaction to shift towards the product side. Several studies have been conducted to increase the hydrogen production utilizing membrane reactors [See: H. Lim, Y. Gu, and S. T. Oyama, "Studies of the effect of pressure and hydrogen permeance on the ethanol steam reforming reaction with palladium- and silica-based membranes,"; and Z. W. Dunbar, "Hydrogen purification of synthetic water gas shift gases using microstructured palladium membranes"].

Integration of Oxygen Transport Reactors (OTRs) with hydrogen production has the potential to enhance the production rate in co-generation with carbon-free power production. Ion Transport Membranes (ITMs) in an OTR selectively allows oxygen transport in the temperature range of 800° C. to 1100° C., providing high-purity oxygen for an oxy-combustion process.

EP3089943B1 discloses an oxy-combustion system with thermally integrated ammonia synthesis. The oxy-combustion system includes (1) an air separation unit that separates an air feed stream into an oxygen stream and a nitrogen stream, (2) an ammonia synthesis unit that synthesizes ammonia from a hydrogen feed stream and the nitrogen stream from the air separation unit to form a crude ammonia stream, and (3) an oxy-combustion reactor that combusts a fuel from a fuel feed stream in the presence of the oxygen stream from the air separation unit. However, this reference does not describe obtaining a hydrogen feed stream or about using the combustion gas to produce power.

U.S. Ser. No. 10/619,571B2 discloses a system including (1) a first oxygen transport reactor (OTR) having a first ion transport membrane (ITM) for splitting $H_2O$ into $O_2$ and $H_2$, and separating $O_2$ from $H_2$, (2) a second OTR having a second ITM for splitting $CO_2$ into CO and $O_2$, and separating $O_2$ from CO, and (3) a turbine for producing power from a first combustion gas mixture resulting from combusting the $H_2$ and/or CO. As such, the product gases $H_2$, CO and $O_2$ are used solely for combustion to produce power via a turbine.

U.S. Ser. No. 10/597,292B2 discloses a process for generating power and hydrogen. The process includes combusting a natural gas/water stream to produce hydrogen, separating the hydrogen using a hydrogen-permeable membrane, and combusting the separated hydrogen for power generation. While an ion transport membrane (ITM) may be used for separating oxygen from air to be used for combustion, no nitrogen is generated or separated. Therefore, no ammonia is produced.

Each of the aforementioned prior art suffers from one or more drawbacks hindering their adoption.

SUMMARY

In an exemplary embodiment, a system for co-generating ammonia and power is disclosed. The system includes a first oxygen transport reactor (OTR) having a first ion transport membrane (ITM) separating a first feed side and a first permeate side. The first feed side includes a first feed inlet and a first feed outlet. The first permeate side includes a first permeate inlet and a first permeate outlet. The first feed inlet is configured to receive water vapor to be converted into hydrogen and first oxygen on the first feed side. The first ITM is configured to selectively permeate the first oxygen to the first permeate side for combustion, and the first feed outlet is configured to discharge the hydrogen. The first permeate outlet is configured to discharge a first combustion gas. The system includes a second OTR having a second ITM separating a second feed side and a second permeate side. The second feed side includes a second feed inlet and a second feed outlet. The second permeate side includes a second permeate inlet and a second permeate outlet. The second feed inlet is configured to receive air comprising nitrogen and second oxygen. The second ITM is configured to selectively permeate the second oxygen to the second permeate side for combustion. The second feed outlet is configured to discharge the nitrogen. The second permeate outlet is configured to discharge a second combustion gas. The system further includes a convertor for receiving the hydrogen from the first feed outlet and the nitrogen from the second feed outlet to produce ammonia. A gas turbine of the system is configured to receive the first combustion gas from the first permeate outlet and the second combustion gas from the second permeate outlet to produce power. The first OTR is positioned adjacent to the second OTR and configured to absorb combustion heat from the second OTR.

In some embodiments, the system includes a plurality of first OTRs and a plurality of second OTRs. The plurality of first OTRs and the plurality of second OTRs are arranged substantially parallel to one another along a first direction.

In some embodiments, one or more first OTRs and one or more second OTRs are arranged alternatingly in a second direction that is perpendicular to the first direction. At least one first OTR and at least one second OTR are arranged alternatingly in a third direction that is perpendicular to the first direction and the second direction.

In some embodiments, the one or more first OTRs and the one or more second OTRs are evenly spaced in the second direction. The at least one first OTR and the at least one second OTR are evenly spaced in the third direction.

In some embodiments, the first OTR and the second OTR are in direct contact with each other for heat exchange.

In some embodiments, the system includes a plurality of first OTRs and a plurality of second OTRs. At least one first OTR is in direct contact with four second OTRs, and at least one second OTR is in direct contact with four first OTRs.

In some embodiments, the system further includes a heat conducting structure that connects the first OTR to the second OTR. The heat conducting structure includes a heat conductor material having a melting point above 1100° C.

In some embodiments, the heat conducting structure includes a first portion that surrounds and is in direct contact with the first OTR, a second portion that surrounds and is in direct contact with the second OTR, and a third portion connecting the first portion to the second portion.

In some embodiments, the system further includes a shell that surrounds the first OTR and the second OTR, the shell comprising a thermal insulator material.

In some embodiments, the system further includes a filler structure filling empty space between the first OTR and the second OTR in the shell, the filler structure comprising a heat conductor material having a melting point above 1100° C.

In some embodiments, a heat transfer medium is configured to fill empty space between the first OTR and the second OTR in the shell, the heat transfer medium comprises metallic beads.

In some embodiments, the first OTR is cuboid or cylindrical, and the second OTR is cuboid or cylindrical.

In some embodiments, the system further includes a condenser for cooling the first combustion gas and the second combustion gas, which exit from the gas turbine, to obtain carbon dioxide gas and liquid water In some embodiments, the system further includes a concentrated solar power (CSP) system configured to provide heat for the first OTR and the second OTR.

In some embodiments, the CSP is configured to heat the liquid water, which exits from the condenser, to obtain water vapor to be fed to the first feed inlet.

In some embodiments, the system further includes a compressor for compressing the carbon dioxide gas to obtain compressed carbon dioxide.

In some embodiments, the system further includes a storage unit for storing a first portion of the compressed carbon oxide, and a conduit configured to direct a second portion of the compressed carbon oxide to the first permeate inlet and the second permeate inlet.

In some embodiments, a heat exchanger located between the first OTR and the condenser and configured for the liquid water, which exits the condenser, to absorb heat from the convertor before fed to the first feed inlet.

In some embodiments, the system further includes a manifold located upstream the first OTR and the second OTR. The manifold includes a connection surface and a plurality of delivery pipes configured to deliver a fuel composition individually to the first permeate inlet and the second permeate inlet.

In some embodiments, the system further includes a plurality of valves, where each valve is configured to individually open or close a respective delivery pipe.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
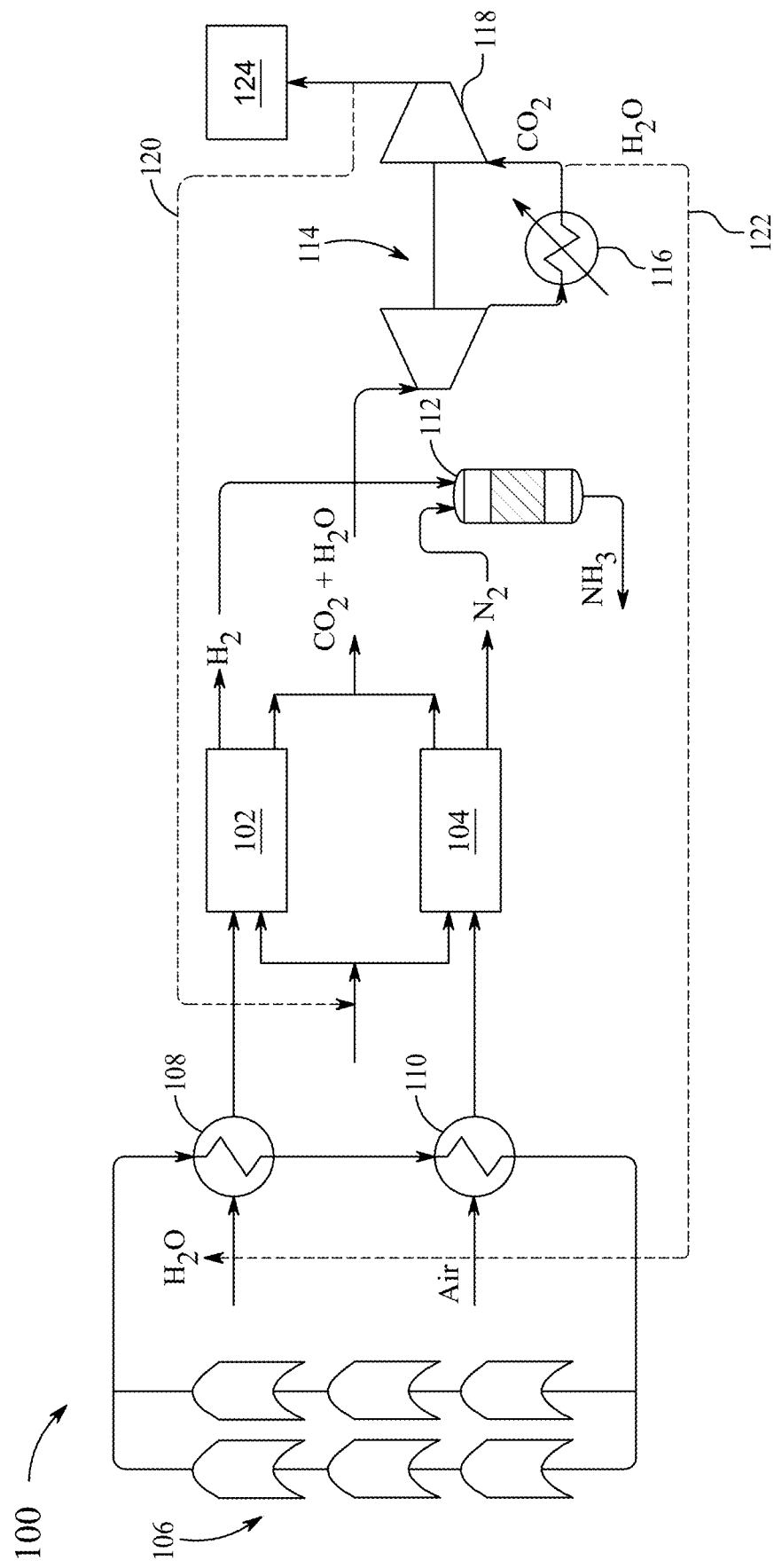
FIG. 1 is an exemplary system for co-generation of ammonia and power, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to a system for co-generating ammonia and power. Oxygen may be produced through water splitting at a feed side of an ion transport membrane (ITM) in an oxygen transport reactor (OTR), where the oxygen can permeate selectively to a combustion chamber (e.g. a permeate side of the ITM) due to high oxygen partial pressure gradient. Combustion gases can be used to run a turbine to generate power. The oxygen-depleted feed side will shift the water splitting reaction towards a product side enhancing the hydrogen production, which can be used for ammonia production.

Referring to FIG. 1, a system 100 for co-generating ammonia and power is illustrated. The system 100 includes a first oxygen transport reactor (OTR) 102 (hereinafter referred to as "the first ORT 102") embodied as a water splitting OTR, and a second OTR 104 embodied as an air separation OTR. As such, a feed to the first OTR 102 is water and a feed to the second OTR 104 is air. In an aspect, each of the first OTR 102 and the second OTR 104 is configured to allow oxy-combustion of hydrocarbons.

The system 100 can include a concentrating solar power (CSP) unit 106 configured to provide energy for an endothermic water splitting reaction in the first OTR 102 and heat the air being fed into the second OTR 104. The CSP unit 106 may include a plurality of mirrors such as parabolic trough reflectors (not shown) used to reflect, concentrate, and focus natural sunlight onto a specific point, which is then converted into heat. In some embodiments, such heat may be stored and used during the days with no sunlight or before sunrise and after sunset. The stored heat may be used to thermally energize the water and the air being fed into the first OTR 102 and the second OTR 104, respectively. In some embodiments, the heat generated with the help of the plurality of mirrors may be used to generate steam and the steam may be circulated through heat exchanging units, such as a first heat exchanging (HE) unit 108 and a second HE unit 110. As shown in FIG. 1, feed water is allowed to pass through the first HE unit 108 where the feed water may be heated by the steam flowing through the first HE unit 108, and the air is allowed to pass through the second HE unit 110 where the air may be heated by the steam flowing through the second HE unit 110. The first OTR 102 is configured to implement a process of converting the feed water into its elemental forms as hydrogen and oxygen by direct decomposition, i.e. water splitting. The second OTR 104 is configured to implement a process of splitting atmospheric air into its primary components, typically a nitrogen-rich gas and an oxygen-rich gas, preferably nitrogen and oxygen, i.e. air separation. In an embodiment, each of the first OTR 102 and the second OTR 104 is supplied with fuel to support operation of combustion. The first OTR 102 is positioned adjacent to the second OTR 104 and configured to absorb combustion heat from the second OTR 104. Oxygen obtained through each of the water splitting and the air separation is used for the combustion process in the combustor. As such, the first OTR 102 and the second OTR 104 is designed for oxy-combustion of the fuel in the presence of oxygen generated or obtained therein. Therefore, the present disclosure replaces conventional combustion chamber with the OTRs.

The hydrogen gas generated in the first OTR 102 due to the water splitting and the nitrogen gas generated in the second OTR 104 due to air splitting are directed into a converter 112, such as a catalytic converter configured to produce ammonia based on Haber's process. The ammonia thus produced is directed towards a storage chamber (not shown). Further, hot combustion gases (typically, carbon dioxide and water vapor) from each of the first OTR 102 and the second OTR 104 are used to run a gas turbine 114, thereby generating power from the gas turbine 114. Flue gas from the gas turbine 114 is allowed to flow through a condenser 116, where the flue gas is cooled to separate the carbon dioxide from the water vapor, or rather, from condenser water. The carbon dioxide thus separated is directed through a compressor 118 of the gas turbine 114. Compressed carbon dioxide is preferably subjected to sequestration. As used herein, the term sequestration refers to trapping of the carbon dioxide from the mixture of carbon dioxide and water vapor, and isolation of the carbon dioxide in a natural or artificial storage area. In some embodiments, the system 100 may include a storage unit 124 for storing a first portion of the compressed carbon dioxide, and a conduit 120 configured to direct a second portion of the compressed carbon dioxide to the first OTR 102 and the second OTR 104.

In some embodiments, a fraction of the compressed carbon dioxide may be recycled (via the conduit 120) into the first OTR 102 and the second OTR 104, preferably with the fuel, to control temperature of gases in the oxy-combustion process. Simultaneously, condensed water vapor from the condenser 116 is recirculated (through a recirculation path 122) into the feed water supply as shown in FIG. 1. In some embodiments, the CSP unit 106 may be configured to heat the recirculated condensed water vapor (or, liquid water) to obtain water vapor to be fed into the first OTR 102.

Figure 2:
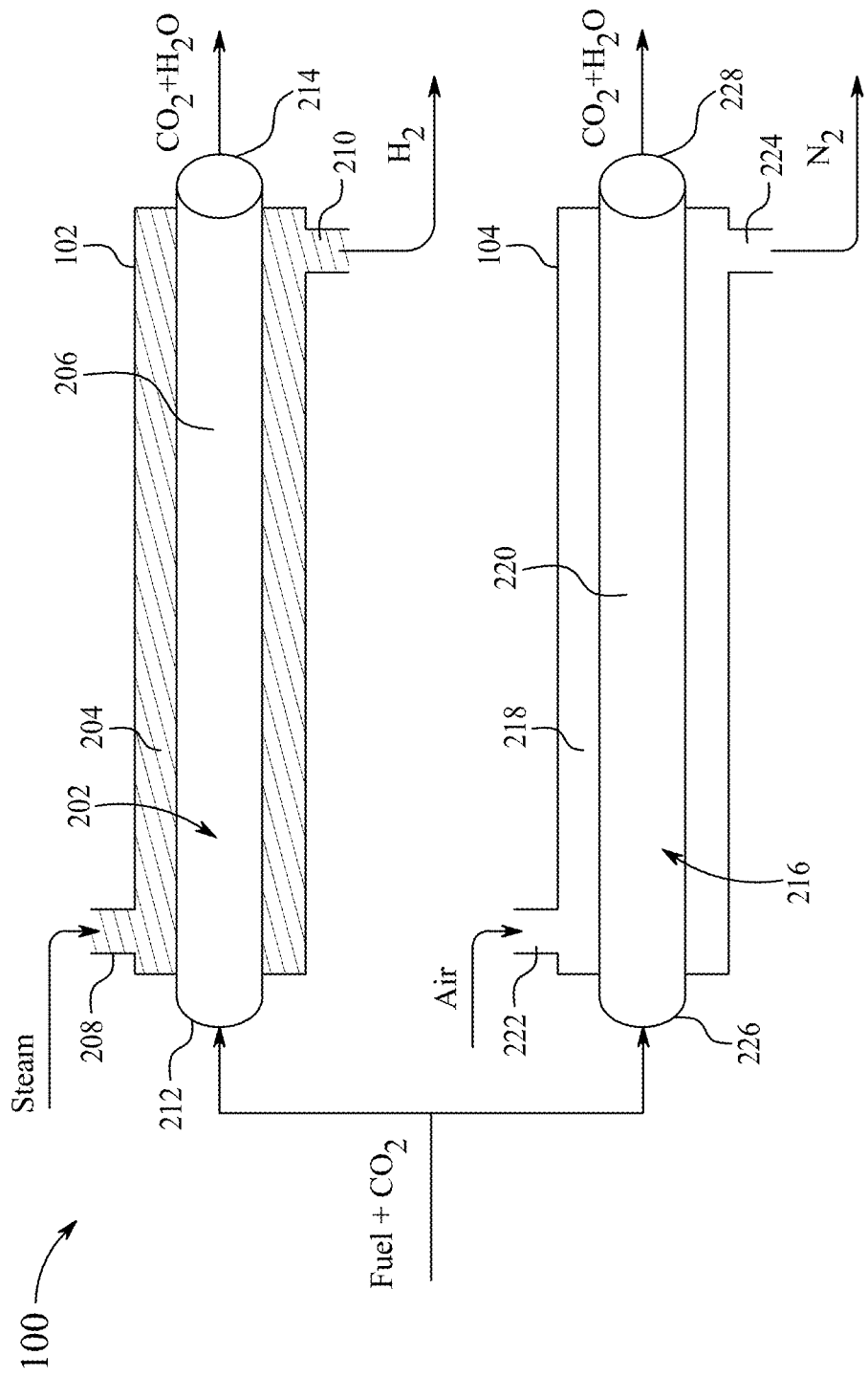
FIG. 2 illustrates a first oxygen transport reactor (OTR) and a second OTR of the system of FIG. 1, according to certain embodiments.

FIG. 2 illustrates an exemplary view of the first OTR 102 and the second OTR 104 of FIG. 1. Aspects of FIG. 2 are described in conjunction with FIG. 1. The first OTR 102 includes a first ion transport membrane (ITM) 202 (hereinafter referred to as the "first ITM 202") configured to separate a first feed side 204 and a first permeate side 206. The first feed side 204 includes a first feed inlet 208 and a first feed outlet 210. The first permeate side 206 includes a first permeate inlet 212 and a first permeate outlet 214. The first feed inlet 208 is configured to receive the water vapor to be converted into the hydrogen and first oxygen on the first feed side 204, and the first ITM 202 is configured to selectively permeate the first oxygen to the first permeate side 206 for combustion. The first feed outlet 210 is configured to discharge the hydrogen.

The second OTR 104 includes a second ion transport membrane (ITM) 216 (hereinafter referred to as the "second ITM 216") configured to separate a second feed side 218 and a second permeate side 220. The second feed side 218 includes a second feed inlet 222 and a second feed outlet 224. The second permeate side 220 includes a second permeate inlet 226 and a second permeate outlet 228. The second feed inlet 222 is configured to receive air comprising nitrogen and second oxygen. The second ITM 216 is configured to selectively permeate the second oxygen to the second permeate side 220 for combustion. The second feed outlet 224 is configured to discharge the nitrogen.

In some embodiments, the CSP unit 106 is configured to maintain the first ITM 202 and the second ITM 216 at an elevated temperature of about 800-1100° C. to retain each of the first ITM 202 and the second ITM 216 activated for permeation of the first oxygen and the second oxygen, respectively. The terms "first oxygen" and "second oxygen" are used only for the purpose of differentiation with respect to the first OTR 102 and the second OTR 104. The first oxygen and the second oxygen thus separated in the first OTR 102 and the second OTR 104 permeates through the first ITM 202 and the second ITM 216, respectively, to a corresponding sweep side (permeate side), where the fuel supplied into each OTR is burned in the presence of oxygen and the recycled carbon dioxide. A selective permeation of the first oxygen to the first permeate side creates an oxygen deficiency in the first feed side, which shifts the water splitting towards a product side resulting in increased production of the hydrogen. As described earlier, the CSP unit 106 also heats the atmospheric air to a temperature of about 800° C. prior to being introduced into the second OTR 104, so that the second oxygen is separated from nitrogen through the activated second ITM 216. On the second permeate side 220, the oxy-combustion of the fuel takes place, which creates a low oxygen partial pressure. Thus, a high oxygen partial pressure gradient cross the second ITM 216 boosts the permeation of the second oxygen towards the second permeate side 220 and an oxygen-depleted air (that is, air rich in nitrogen) is supplied into the converter 112.

The first feed outlet 210 and the second feed outlet 224 are fluidly connected to the converter 112. As such, the hydrogen produced in the first OTR 102 is allowed to flow into the converter 112, where the hydrogen reacts with the nitrogen from the second OTR 104, in the presence of a catalyst, to form ammonia. Similarly, the gas turbine 114 is in fluid communication with the first permeate outlet 214 and the second permeate outlet 228 to receive the combustion gases from the first OTR 102 and the second OTR 104, respectively. The conduit 120 extending from the gas turbine 114 is in fluid communication with the first permeate inlet 212 and the second permeate inlet 226 to direct the second portion of compressed carbon oxide.

Figure 3:
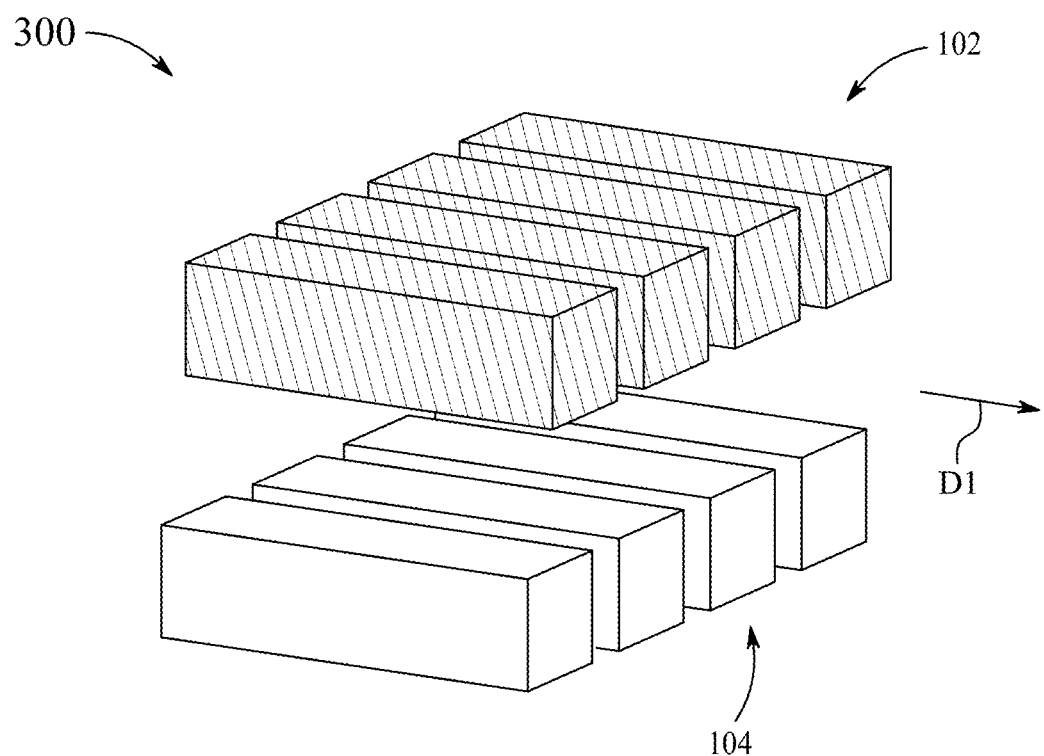
FIG. 3 illustrates a first exemplary arrangement of multiple first OTRs and multiple second OTRs, according to certain embodiments.

FIG. 3 illustrates a first exemplary arrangement 300 of an array of first OTRs 102 and an array of second OTRs 104. In an embodiment, the system 100 may include a plurality of first OTRs 102 and a plurality of second OTRs 104. The plurality of first OTRs 102 and the plurality of second OTRs 104 may be arranged substantially parallel to one another along a first direction "D1". Each OTR in the plurality of first OTRs 102 and the plurality of second OTRs 104 is illustrated as a cuboid only for the purpose of illustration and should not be construed as limiting. In some embodiments, each OTR in the plurality of first OTRs 102 and the plurality of second OTRs 104 may be cylindrical or polygonal in structure.

Figure 4:
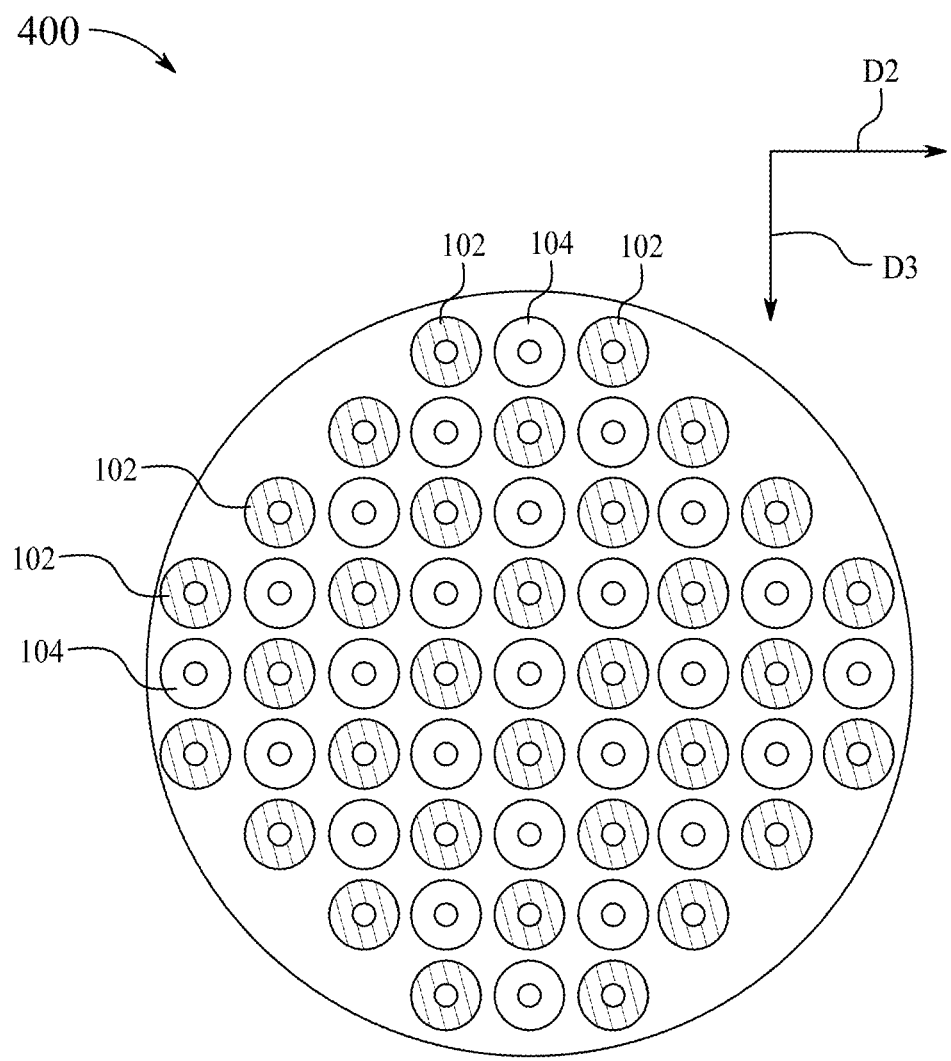
FIG. 4 illustrates a second exemplary arrangement of multiple first OTRs and multiple second OTRs, according to certain embodiments.

FIG. 4 illustrates a second exemplary arrangement 400 of an array of first OTRs 102 and an array of second OTRs 104. In an embodiment, one or more first OTRs 102 and one or more second OTRs 104 may be arranged alternatingly in a second direction "D2" that is perpendicular to the first direction "D1". In an embodiment, at least one first OTR 102 and at least one second OTR 104 are arranged alternatingly in a third direction "D3" that is perpendicular to the first direction "D1" and the second direction "D2". In some embodiments, the one or more first OTRs 102 and the one or more second OTRs 104 may be evenly spaced in the second direction "D2". In some embodiments, the at least one first OTR 102 and the at least one second OTR 104 may be evenly spaced in the third direction "D3".

Figure 5:
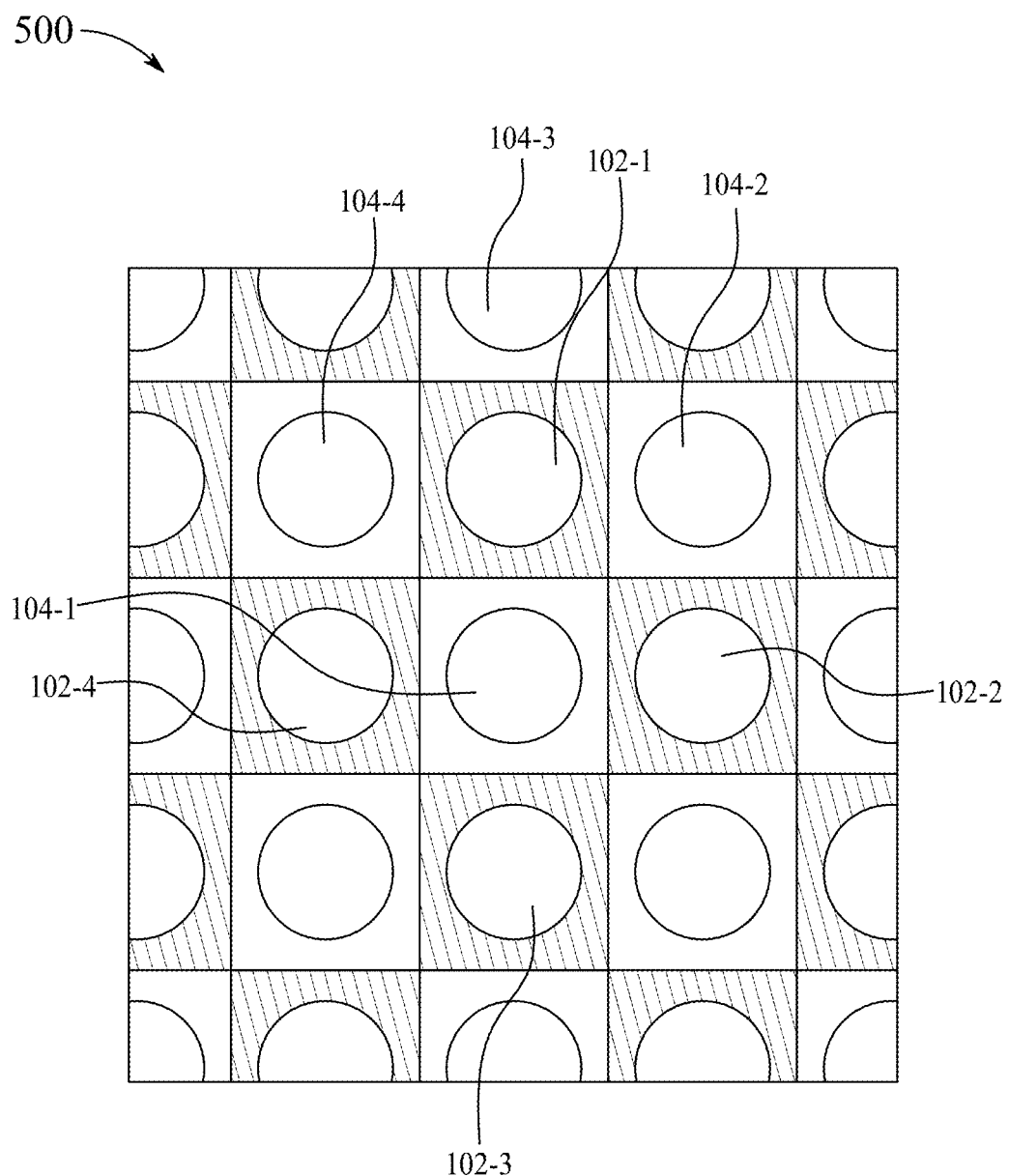
FIG. 5 illustrates a third exemplary arrangement of multiple first OTRs and multiple second OTRs, according to certain embodiments.

FIG. 5 illustrates a third exemplary arrangement 500 of the first OTRs 102 and the second OTRs 104. In an embodiment, the first OTR 102 and the second OTR 104 are in direct contact with each other for heat exchange. In an embodiment, at least one first OTR 102 is in direct contact with four second OTRs 104, and at least one second OTR 104 is in direct contact with four first OTRs 102. For example, as shown in FIG. 5, the first OTR 102-1 is in direct contact with four second OTRs 104-1, 104-2, 104-3, and 104-4. Similarly, the second OTR 104-1 is in direct contact with four first OTs 102-1, 102-2, 102-3, and 102-4. As illustrated in FIG. 5, each of the first OTR 102 and the second OTR 104 may be cuboid or cylindrical. Each OTR, in the cross-section view, may have a vessel having a rectangular exterior thereof for heat exchange and a circular interior thereof for mass convention. Such vessels are configured to increase contact area and thus facilitate heat exchange between the first OTRs 102 and the second OTRs 104. The vessels can include a heat conductor material having a melting point above 1100° C. Note that water splitting is an endothermic reaction. The first OTRs 102 can be configured to absorb combustion heat from the second OTRs. Such a design can effectively utilize combustion heat and help maintain the first OTRs 102 and the second OTRs 104 in a temperature range of 800° C. to 1100° C.

Figure 6:
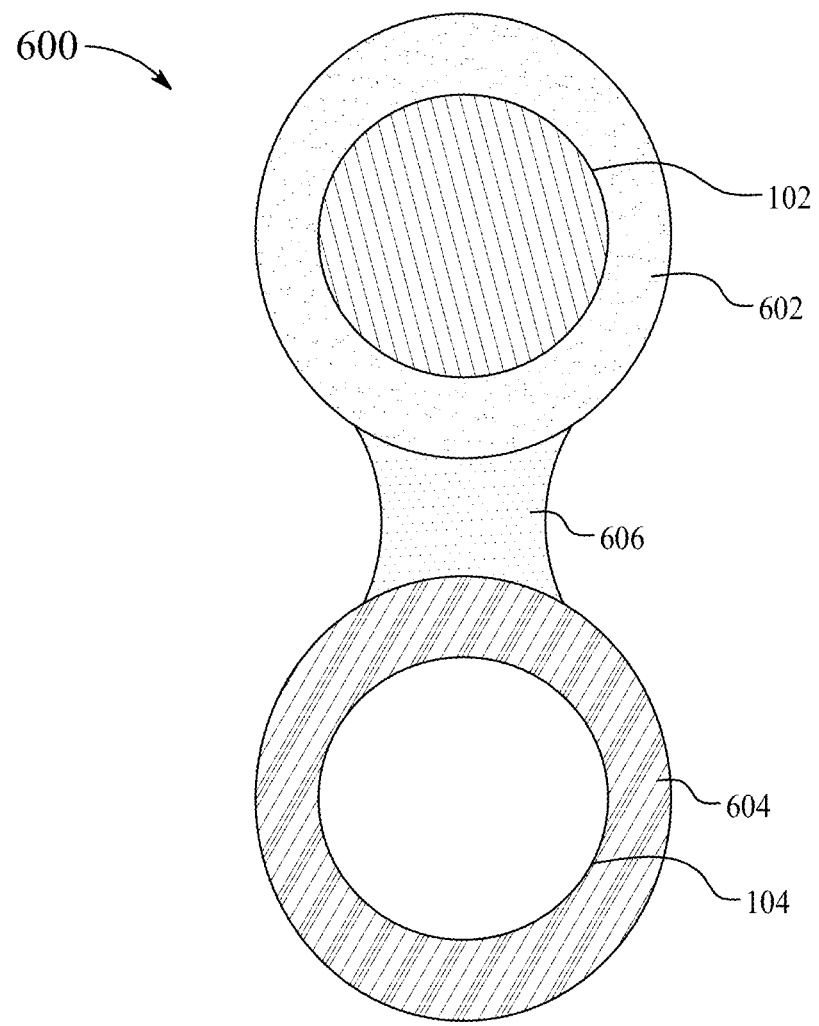
FIG. 6 illustrates a heat conducting structure for the first OTR and the second OTR, according to certain embodiments.

In some embodiments, the system 100 includes a heat conducting structure connecting the first OTR 102 with the second OTR 104. In an embodiment, the heat conducting structure may include a heat conductor material having a melting point above 1100° C. In some embodiments, the heat conducting structure may be implemented as fins that connect two or more plates. FIG. 6 illustrates an exemplary heat conducting structure 600 having a first portion 602 that surrounds and is in direct contact with the first OTR 102; a second portion 604 that surrounds and is in direct contact with the second OTR 104; and a third portion 606 that connects the first portion 602 and the second portion 604. For the purpose of brevity, one first OTR 102 and one second OTR 104 are illustrated in FIG. 6. In embodiments where the system 100 includes a plurality of first OTRs 102 and a plurality of second OTRs 104, one or more similar heat conducting structures may be used to connect each first OTR 102 to a corresponding second OTR 104, or connect at least one first OTR 102 to at least one second OTR 104. Further, shape of each portion of the heat conducting structure 600 is for mere purpose of illustration and should not be construed as limited. In some embodiments, each portion of the heat conducting structure 600 may have a predetermined thickness and a shape.

In a preferable embodiment that third portion 606 connects the second portion 604 and the first portion 602 through a series of stacked plates each plate consisting of a honeycomb metallic structure. The plates are stacked parallel to one another and each plate is separated from a neighboring plate by a gap that is at least the thickness of the honeycomb plate. Each plate has the same thickness which may be in a range of from 2 to 10 cm, preferably 4-8 cm or about 5 cm. The honeycomb plate is advantageous for providing desirable structural integrity and heat conduction between the first and second portions without adding unnecessary weight or complexity to the system.

Figure 7:
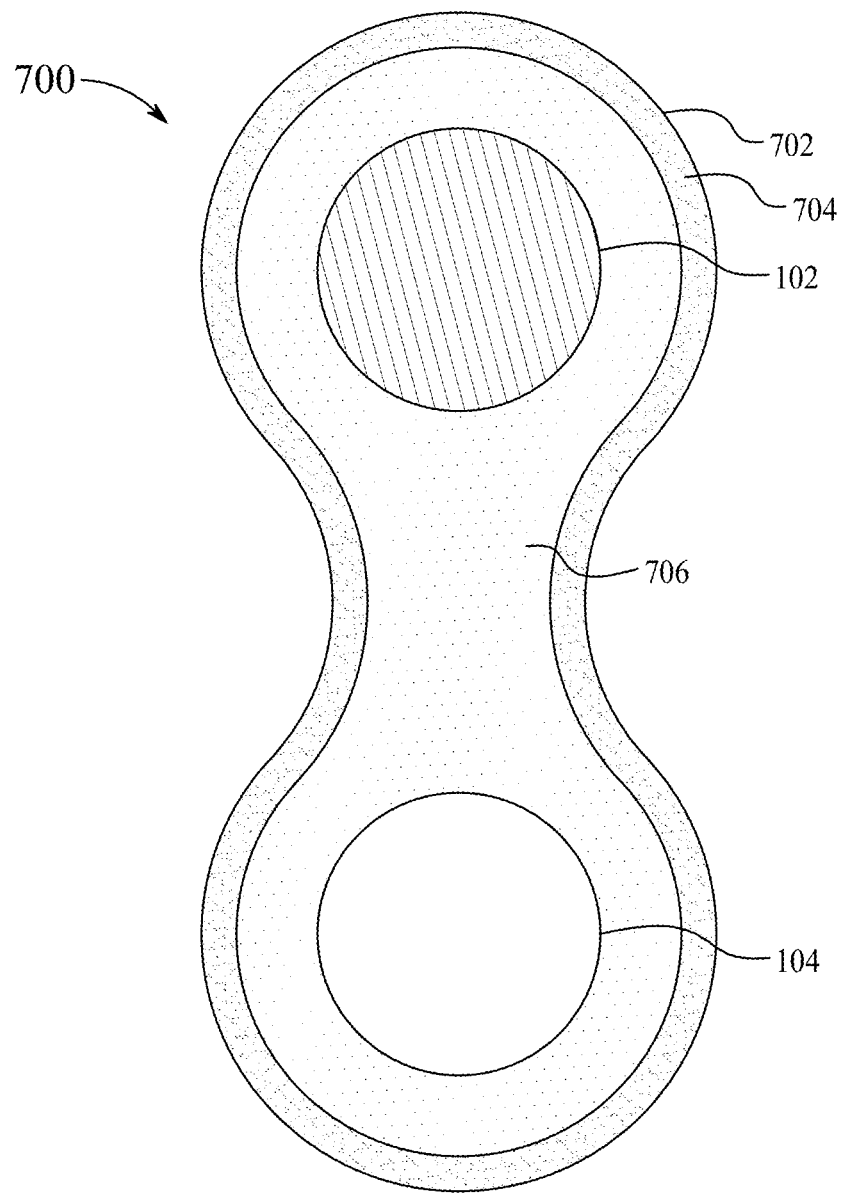
FIG. 7 illustrates a shell that surrounds the first OTR and the second OTR, according to certain embodiments.

FIG. 7 illustrates a fourth exemplary arrangement 700 of the first OTR 102 and the second OTR 104. In an embodiment, the system 100 includes a shell 702 that surrounds the first OTR 102 and the second OTR 104. The shell 702 includes a thermal insulator material 704. In some embodiments, the system 100 may include a filler structure 706 configured to fill empty space between the first OTR 102 and the second OTR 104 in the shell 702. The filler structure 706 may include a heat conductor material having a melting point above 1100° C. In some embodiments, the system 100 may include a heat transfer medium (not shown) configured to fill the empty space between the first OTR 102 and the second OTR 104 in the shell 702. The heat transfer medium may include metallic beads. In some embodiments, the shell 702 may be implemented for the arrangement illustrated and described with respect FIG. 3. In one embodiment, one shell (similar to the shell 702) may surround all the OTRs illustrated in FIG. 3. In another embodiment, each pair of first OTR 102 and second OTR 104, disposed along a column, may be surrounded by a shell. Similarly, multiple shells may be arranged adjacent to each other to form an array of shells. In yet another embodiment, the arrangement illustrated with respect to FIG. 6 may be housed within a shell (similar to the shell 702), where the thermal insulator material may be disposed around the heat conducting structure 600, so that no heat may be lost to the surrounding. Although multiple figures herein illustrates the first OTR 102 and the second OTR 104 in circular configuration, it should be understood that such structure is for mere purpose of illustration and should not be construed as limiting. The shell, having shapes other than that illustrated in FIG. 7, may be used to surround first OTR 102 and the second 104, or array of OTRs, each having the rectangular exterior vessel.

Figure 8:
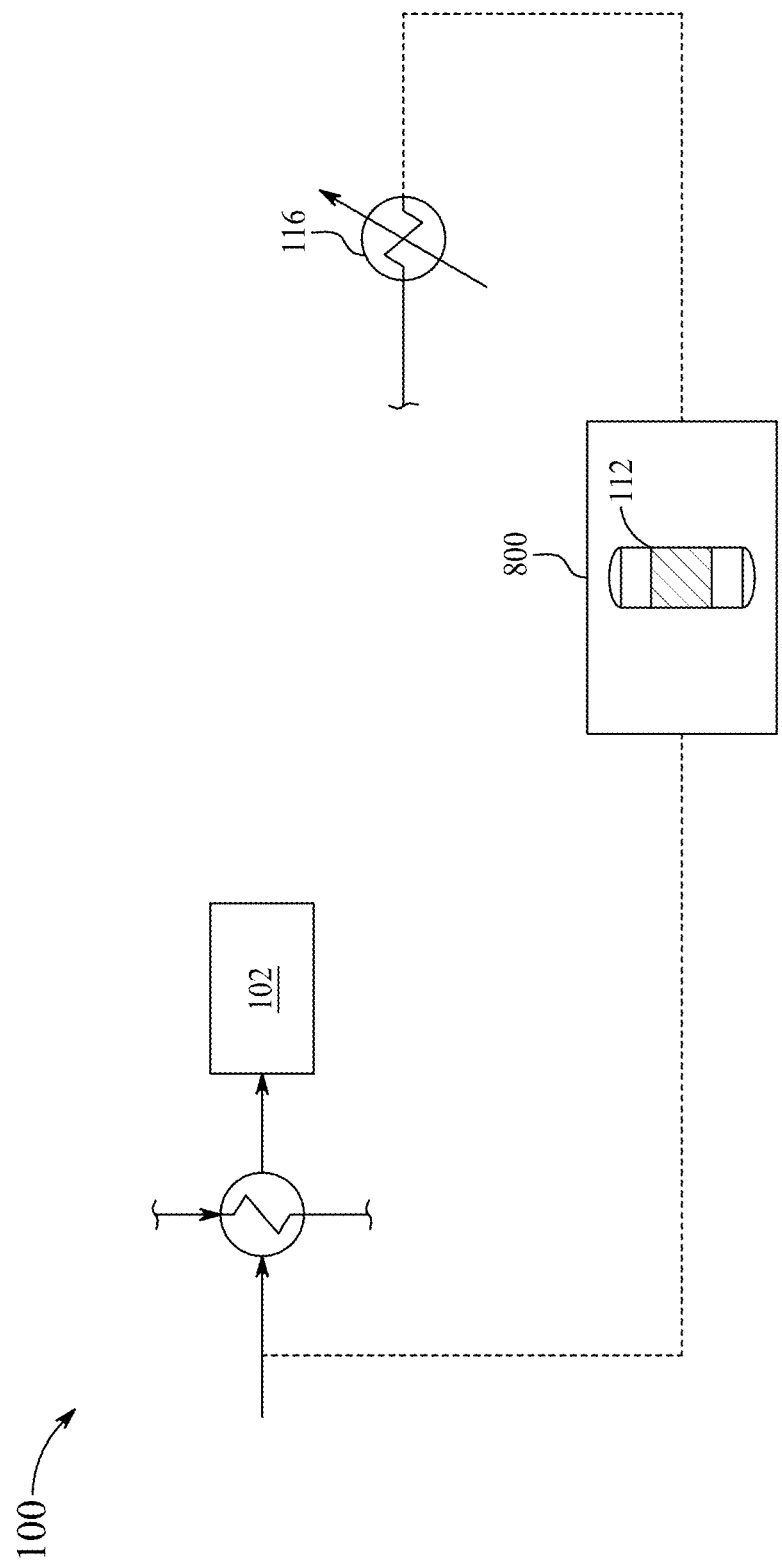
FIG. 8 a heat exchanger implemented in the system of FIG. 1, according to certain embodiments.

In some embodiments, a shell (similar to the shell 702) may surround all the OTRs illustrated in FIG. 4. The shell may have a cylindrical shape or any other shape. A filler structure (similar to the filler structure 706) may be used to fill empty space between the first OTRs 102 and the second OTRs 104 in the shell and thus mechanically hold the first OTRs 102 and the second OTRs 104 in place. The filler structure can also be configured to facilitate heat exchange between the first OTRs 102 and the second OTRs 104. For example, the filler structure may be configured to fit in the shell while having a plurality of holes extending in the D1 direction. The plurality of holes is evenly spaced in the D2 direction and in the D3 direction. The first OTRs 102 and the second OTRs 104 can be alternatingly fitted into the holes, with each hole hosting a respective OTR. For instance, the vessels in FIG. 5 may be combined together and configured as a unitary or seamless piece which functions as a filler structure to host circular OTRs. FIG. 8 illustrates an exemplary heat exchanger 800 of the system 100. In an embodiment, the system 100 includes the heat exchanger 800 located between the first OTR 102 and the condenser 116. The heat exchanger 800 allows the liquid water, which exits the condenser 116, to absorb heat from the converter 112 before the liquid water is fed into the first feed inlet 208. Preferably, the converter 112 is a part of the heat exchanger 800. Such absorption of heat from the converter 112 achieves cooling of the converter 112 and heats the liquid water. Such preheated liquid water is further heated by the CSP unit 106 to convert the preheated liquid water to water vapor prior to feeding into the first feed inlet 208 of the first OTR 102.

The term "heat exchanger" is used to include any heat exchange mechanism through which a coolant or a heat transfer medium can circulate. In some examples, the heat exchanger may include one or more discrete heat exchange devices coupled in series or in parallel. The heat exchanger may include any type of heat exchanger, such as a plate-type heat exchanger, a shell-type heat exchanger, a double-pipe heat exchanger or the like, which generally provides an enlarged effective heat exchanging area by, for example, being corrugated and/or provided with protruding portions of some suitable kind, such as flanges, to allow for heat transfer between two fluids.

Figure 9:
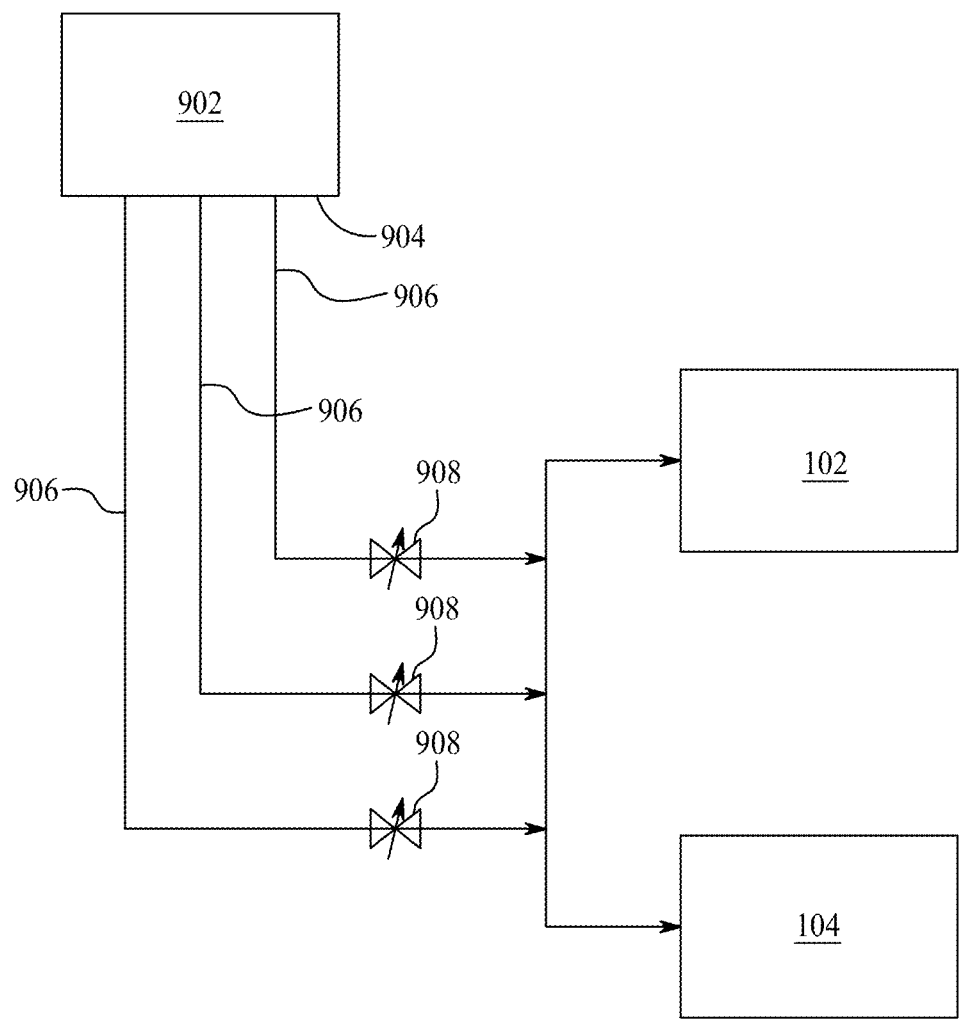
FIG. 9 illustrates an exemplary fuel supply unit of the system, according to certain embodiments.

FIG. 9 shows an exemplary fuel supply unit 900. In an embodiment, the system 100 includes a manifold 902 located upstream the first OTR 102 and the second OTR 104. The manifold 902 includes a connection surface 904 and a plurality of delivery pipes 906 configured to deliver a fuel composition individually to the first OTR 102 and the second OTR 104. Specifically, the delivery pipes 906 are configured to deliver the fuel to the first permeate inlet 212 and the second permeate inlet 226.

In some embodiments, an upstream end of the combustor includes the manifold 902 with a footprint substantially matching a footprint of the combustor. For example, if the upstream end of the combustor is cylindrical with an exposed end surface (that is, circular cross-section), the manifold 902 may have a surface at least matching an area inside the cross-section of the combustor, preferably larger than the cross-section of the combustor in the same or substantially same shape. The delivery pipes 906 are in fluid communication with a space on the upstream side of the connection surface 904 that may be conical to permit even distribution of the fuel and carbon dioxide mixture at substantially equivalent pressures to each OTR. In some embodiments, the system 100 includes a plurality of valves 908. Each valve 908 is configured to individually open or close a respective delivery pipe 906. In some embodiments, the OTRs inside the combustor may not be connected to each other. The OTRs may be held inside the combustor by their connections to the connecting surface 904 and corresponding downstream pipes. In an alternative embodiment, the OTRs may be connected with connecting plates located along an axis of each OTR.

To this end, the system 100 of the present disclosure is capable of generating power with zero carbon emission and co-production of ammonia as a clean energy carrier. The combustion gases from the oxy-combustion of fuel in the combustor is used to run the gas turbine and thus generate power. Since the CSP unit 106 is used to provide energy to the water feed and air, requirement of additional heating units may be eliminated. The OTRs of the present disclosure replaces conventional combustion chambers. Oxygen is separated from heated air in the second OTR 104 for the oxy-combustion of fuel. Due to high consumption of oxygen in the oxy-combustion process at the feed side of the ITM, a high oxygen partial pressure gradient across the ITM is created. This enhances the permeation rate of oxygen.

Figure 10:
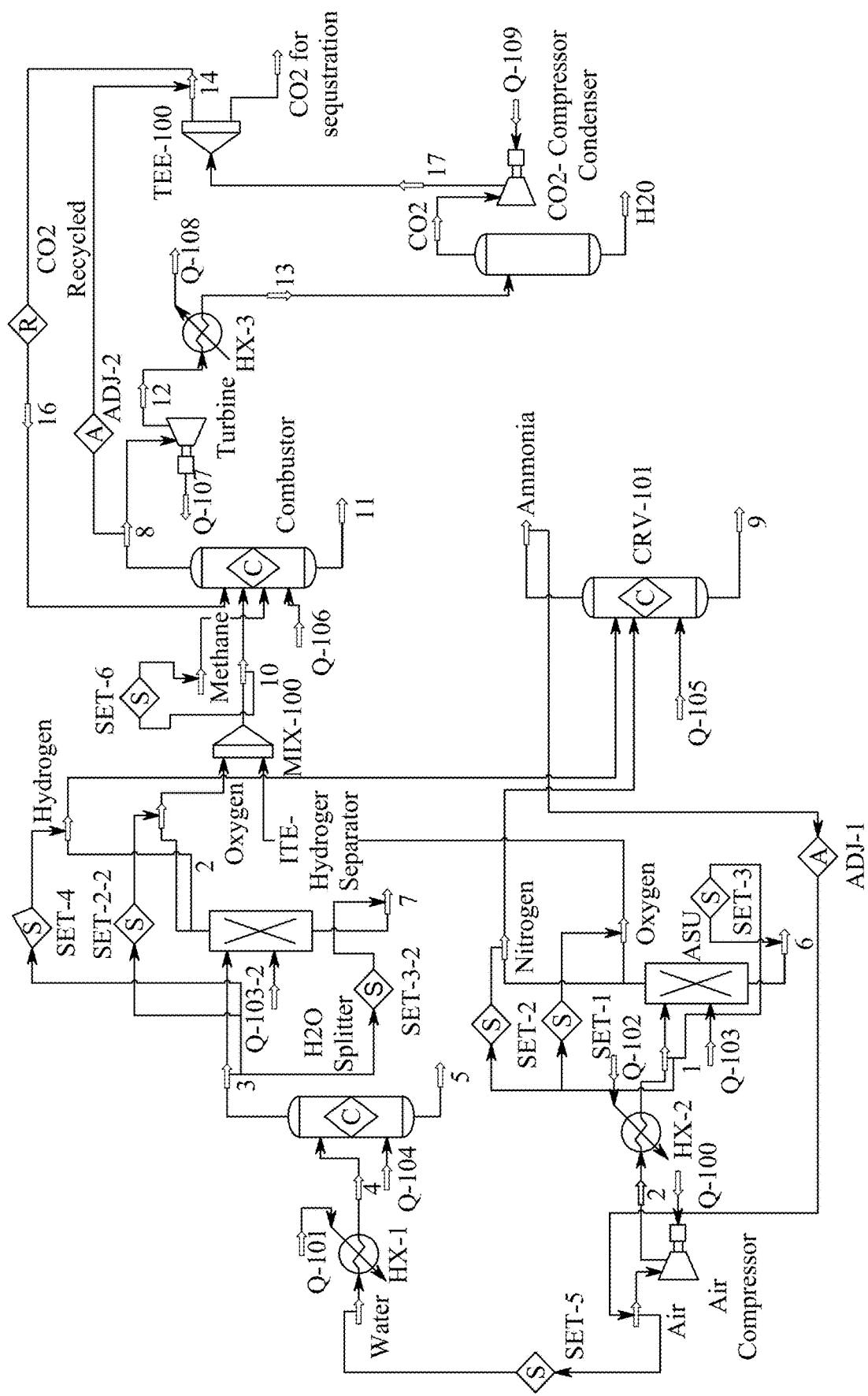
FIG. 10 illustrates a schematic diagram of the system 100 modeled on Aspen Hysys software application, according to an aspect of the present disclosure.

FIG. 10 illustrates a schematic diagram of the system 100 modeled on Aspen Hysys software application. As seen in the FIG. 10, water and air are the input components that are required for the oxy-combustion and ammonia production. The system 100 is normalized for the production rate of 1 kg/s of ammonia.

Figure 11:
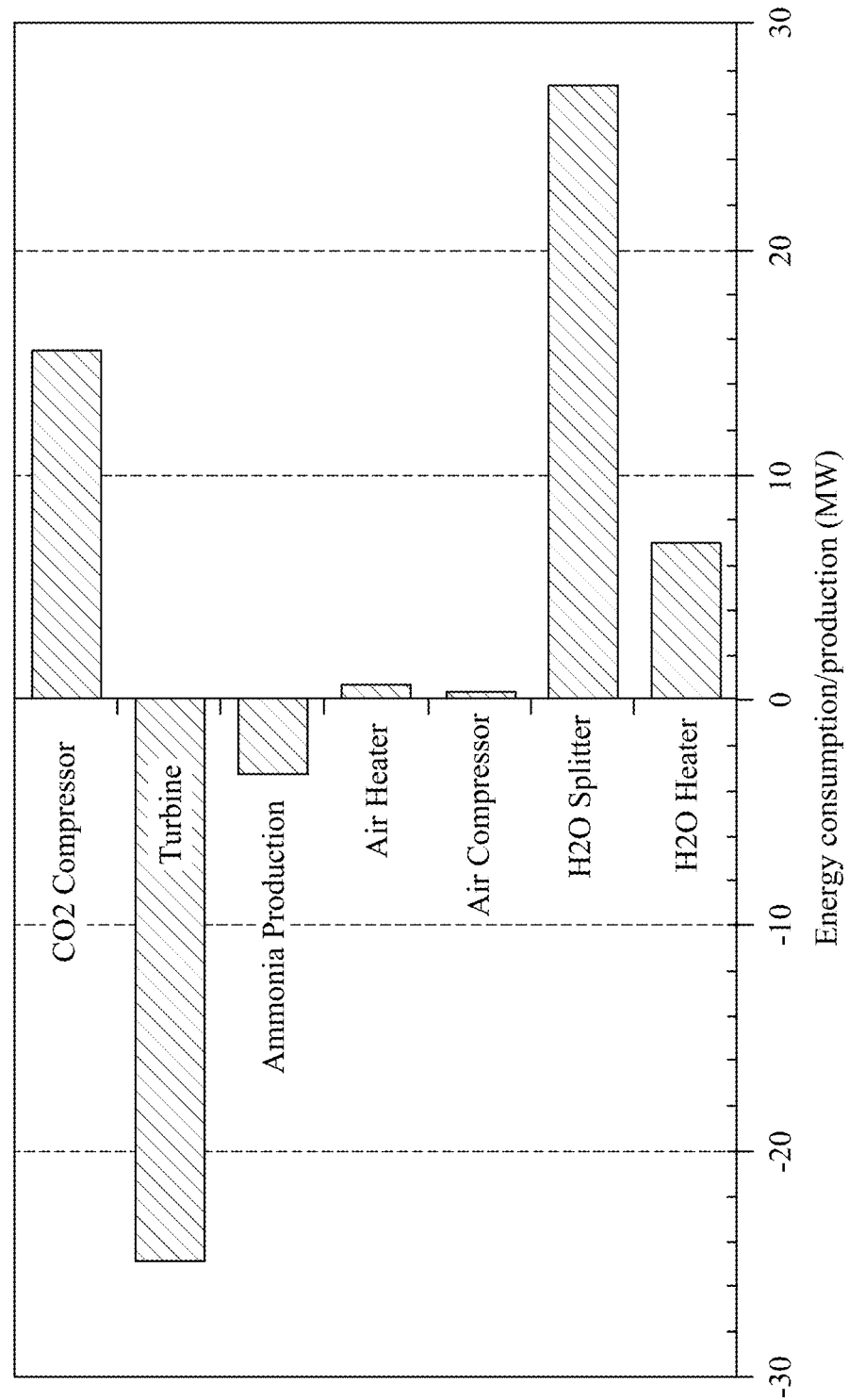
FIG. 11 is a graphical representation of energy consumed or produced by various components of the system, according to an aspect of the present disclosure.

FIG. 11 illustrates a graphical representation of energy consumed or produced by various components of the system 100, according to an aspect of the present disclosure. A total compressor power required is 15.9 MW, while an $H_2O$ splitter and an air separation unit (ASU) consumes 28.9 MW and 0.7 MW of energy, respectively. The energy requirements for the $H_2O$ splitter and the ASU can be met through the CSP unit 106 as discussed above. The system 100 may be able to generate 24.9 MW of the power without any heat recuperation per unit production of ammonia. Note that the air compressor and the air heater in FIG. 11 are main energy-consuming components of the ASU. Therefore, the air compressor and the air heater can be used to approximate an energy consumption of the ASU.

Figure 12:
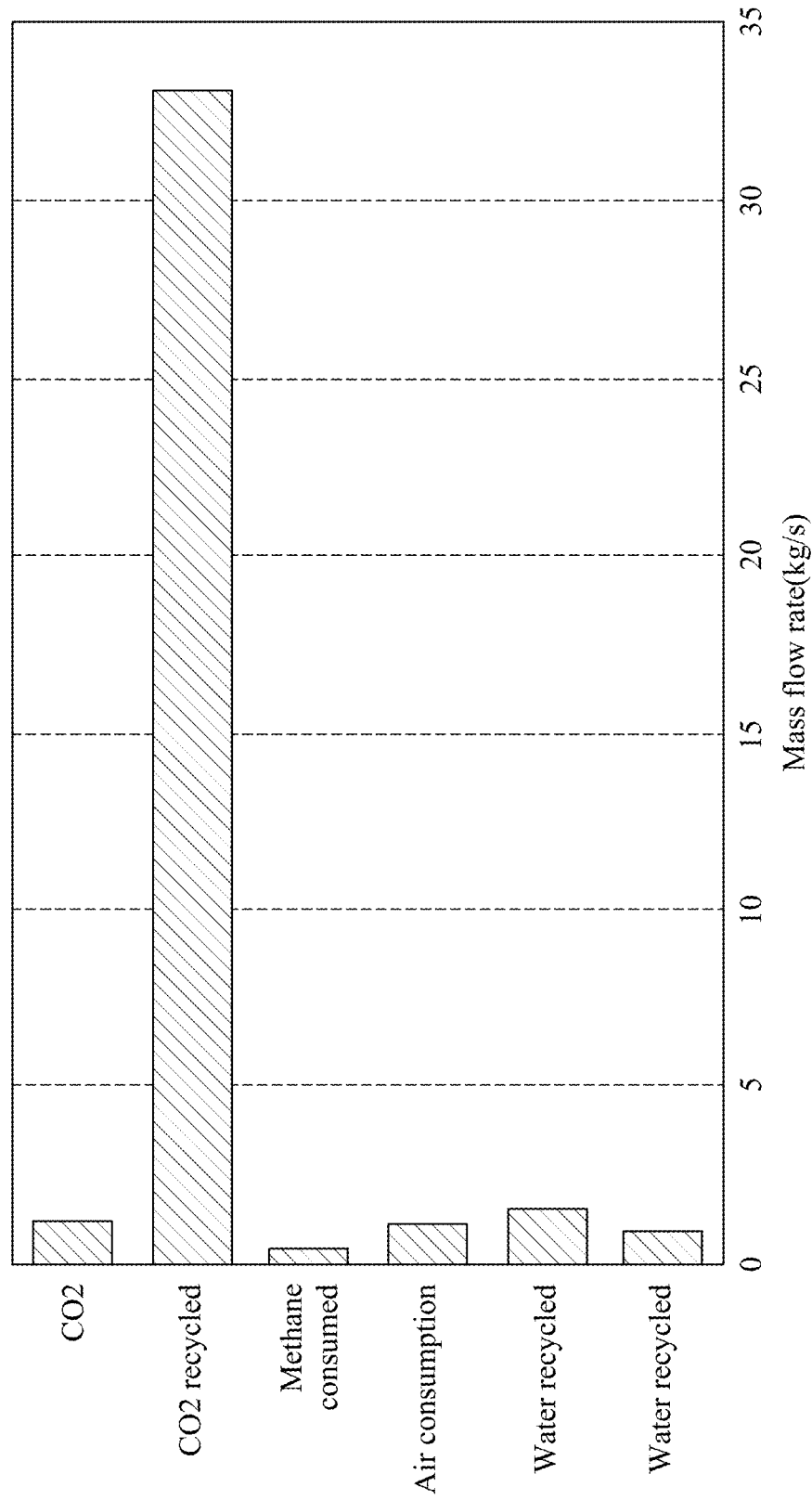
FIG. 12 is a graphical representation of consumption of various species for unit production of ammonia, according to an aspect of the present disclosure.

FIG. 12 illustrates a graphical representation of consumption of various species for unit production of ammonia, according to an aspect of the present disclosure. As seen in FIG. 12, most of the $CO_2$ is recycled (33.13 kg/s) to control the flame temperature of the oxy-combustion. The system 100 utilizes 0.42 kg/s of methane for the oxy-combustion and is able to capture 1.17 kg/s of carbon dioxide for the sequestration. About 1.59 kg/s of water is consumed, out of which 0.9 kg/s can be recycled after condensation process.

The system 100 may be optimized for better efficiency through heat recovery steam generator (HRSG) and heat recuperation at several stages.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A system for co-generating ammonia and power, the system comprising:
   a first oxygen transport reactor (OTR) comprising a first ion transport membrane (ITM) separating a first feed side and a first permeate side, the first feed side including a first feed inlet and a first feed outlet, the first permeate side including a first permeate inlet and a first permeate outlet, wherein the first feed inlet is configured to receive water vapor to be converted into hydrogen and first oxygen on the first feed side, the first ITM is configured to selectively permeate the first oxygen to the first permeate side for combustion, the first feed outlet is configured to discharge the hydrogen, and the first permeate outlet is configured to discharge a first combustion gas;
   a second OTR comprising a second ITM separating a second feed side and a second permeate side, the second feed side including a second feed inlet and a second feed outlet, the second permeate side including a second permeate inlet and a second permeate outlet, wherein the second feed inlet is configured to receive air comprising nitrogen and second oxygen, the second ITM is configured to selectively permeate the second oxygen to the second permeate side for combustion, the second feed outlet is configured to discharge the nitrogen, and the second permeate outlet is configured to discharge a second combustion gas;
   a convertor for receiving the hydrogen from the first feed outlet and the nitrogen from the second feed outlet to produce ammonia; and
   a gas turbine for receiving the first combustion gas from the first permeate outlet and the second combustion gas from the second permeate outlet to produce power,
   wherein the first OTR is positioned adjacent to the second OTR and configured to absorb combustion heat from the second OTR.

2. The system of claim 1, wherein:
   the system includes a plurality of first OTRs and a plurality of second OTRs, and
   the plurality of first OTRs and the plurality of second OTRs are arranged substantially parallel to one another along a first direction.

3. The system of claim 2, wherein:
   one or more first OTRs and one or more second OTRs are arranged alternatingly in a second direction that is perpendicular to the first direction, and
   at least one first OTR and at least one second OTR are arranged alternatingly in a third direction that is perpendicular to the first direction and the second direction.

4. The system of claim 3, wherein:
   the one or more first OTRs and the one or more second OTRs are evenly spaced in the second direction, and
   the at least one first OTR and the at least one second OTR are evenly spaced in the third direction.

5. The system of claim 1, wherein:
   the first OTR and the second OTR are in direct contact with each other for heat exchange.

6. The system of claim 5, wherein:
   the system includes a plurality of first OTRs and a plurality of second OTRs,
   at least one first OTR is in direct contact with four second OTRs, and
   at least one second OTR is in direct contact with four first OTRs.

7. The system of claim 1, further comprising:
   a heat conducting structure that connects the first OTR to the second OTR, the heat conducting structure comprising a heat conductor material having a melting point above 1100° C.

8. The system of claim 7, wherein the heat conducting structure comprises:
   a first portion that surrounds and is in direct contact with the first OTR;
   a second portion that surrounds and is in direct contact with the second OTR; and
   a third portion connecting the first portion to the second portion.

9. The system of claim 1, further comprising:
   a shell that surrounds the first OTR and the second OTR, the shell comprising a thermal insulator material.

10. The system of claim 9, further comprising:
    a filler structure filling empty space between the first OTR and the second OTR in the shell, the filler structure comprising a heat conductor material having a melting point above 1100° C.

11. The system of claim 9, wherein:
    a heat transfer medium is configured to fill empty space between the first OTR and the second OTR in the shell, the heat transfer medium comprises metallic beads.

12. The system of claim 1, wherein:
    the first OTR is cuboid or cylindrical, and
    the second OTR is cuboid or cylindrical.

13. The system of claim 1, further comprising:
    a condenser for cooling the first combustion gas and the second combustion gas, which exit from the gas turbine, to obtain carbon dioxide gas and liquid water.

14. The system of claim 13, further comprising:
    a concentrated solar power system (CSP) configured to provide heat for the first OTR and the second OTR.

15. The system of claim 14, wherein:
    the CSP is configured to heat the liquid water, which exits from the condenser, to obtain water vapor to be fed to the first feed inlet.

16. The system of claim 13, further comprising:
    a compressor for compressing the carbon dioxide gas to obtain compressed carbon dioxide.

17. The system of claim 16, further comprising:
    a storage unit for storing a first portion of the compressed carbon oxide; and
    a conduit configured to direct a second portion of the compressed carbon oxide to the first permeate inlet and the second permeate inlet.

18. The system of claim 13, further comprising:
    a heat exchanger located between the first OTR and the condenser and configured for the liquid water, which exits the condenser, to absorb heat from the convertor before fed to the first feed inlet.

19. The system of claim 1, further comprising:
    a manifold located upstream the first OTR and the second OTR, the manifold comprising a connection surface and a plurality of delivery pipes configured to deliver a fuel composition individually to the first permeate inlet and the second permeate inlet.

20. The system of claim 19, further comprising:
a plurality of valves, each configured to individually open or close a respective delivery pipe.

\* \* \* \* \*